United States Patent [19]

Magee

[11] Patent Number: 4,473,863
[45] Date of Patent: Sep. 25, 1984

[54] APPARATUS FOR AND METHOD OF MAKING AN ELECTRET TAPE

[75] Inventor: Mark R. Magee, Saratoga, Calif.

[73] Assignee: GTE Communication Products Corporation, Stamford, Conn.

[21] Appl. No.: 529,067

[22] Filed: Sep. 2, 1983

[51] Int. Cl.³ .................................................. H05F 3/00
[52] U.S. Cl. ...................................... 361/225; 29/592 E; 179/111 E; 307/400; 430/902
[58] Field of Search ....................... 361/225; 29/592 E; 307/400; 156/273.1, 379.7, 380.2, 380.3; 430/55, 902; 179/111 E

[56] References Cited

U.S. PATENT DOCUMENTS

| | | | |
|---|---|---|---|
| 2,955,938 | 10/1960 | Steinhilper | 430/902 X |
| 3,748,727 | 7/1973 | Swain | 307/400 X |
| 3,798,029 | 3/1974 | Saklikar | 430/902 X |
| 4,213,168 | 7/1980 | Garbett | 361/225 |
| 4,344,810 | 8/1982 | Becker et al. | 156/379.7 |
| 4,382,196 | 5/1983 | Miller et al. | 307/400 |

Primary Examiner—Reinhard J. Eisenzopf
Attorney, Agent, or Firm—Douglas M. Gilbert

[57] ABSTRACT

Apparatus for making an electret tape having an electrically conductive strip with a dielectric layer on one side thereof comprises tape supply and take-up reels arranged to move the tape from the former to the latter in an upwardly inclined plane and an electrostatic charging assembly between the reels having a dielectric fluid applicator for applying the fluid directly to the dielectric layer, a sponge-like electrode connected to a high dc voltage source, and an air blower for drying the fluid on the tape. The electrode is longitudinally spaced from the fluid application point in the direction of tape movement, engages the dielectric layer across its full width, and is wetted on the tape input side by the fluid on the layer. The blower is on the tape output side of the electrode with a baffle spaced closely to the dielectric layer between the blower and the electrode. This arrangement insures that the electrode is continuously wet and that the fluid is dried on the dielectric layer before the latter moves away from the electrode.

8 Claims, 3 Drawing Figures

APPARATUS FOR AND METHOD OF MAKING AN ELECTRET TAPE

This invention was made under contract with the Department of Defense.

RELATED APPLICATION

Ser. No. 529,060, filed Sep. 2, 1983, entitled "APPARATUS FOR AND METHOD OF MAKING AN ELECTRET TAPE."

BACKGROUND OF THE INVENTION

This invention relates to electret tapes and more particularly to improved apparatus for and method of making such tapes.

U.S. Pat. No. 4,213,168 describes apparatus for making an electret tape in which the conductive side of the tape engages and is moved longitudinally by a driver capstan while the Teflon covered tape side passes under a fluid saturated sponge connected to a charging voltage. An air blower dries the tape surface as it exits from the charging sponge. One problem with this technique is the tendency of the sponge to dry out at high tape speeds. This drying problem is exacerbated by the blower air stream that is deflected by the tape onto the sponge. A dry sponge fails in whole or in part to electrostatically charge the Teflon layer resulting in a defective electret tape. Another problem experienced at high production tape speeds and with the steep drop-off angles of the captan surface that droplets of charging fluid separate from the sponge which results in non-uniform charging of the Teflon layer. The reason for this is electrostatic charges recombine under droplets that have left the electric field, causing dead spots or voids in the electret. Also, opposing forces of the forwardly moving tape and backward air flow can cause the separated droplet to remain stationary on the Teflon layer, creating an uncharged line or stripe.

The two problems described above are especially troublesome because compensation of one tends to aggravate the other. Increasing fluid supply to the sponge to compensate the drying effect increases formation of break-away droplets. Increasing the velocity of air flow to dry the fluid more rapidly to impede droplet break-away causes the sponge to dry out, a condition worse than an overly wet sponge.

This invention is directed to a solution of these problems.

OBJECTS AND SUMMARY OF THE INVENTION

A general object of the invention is the provision of electret tape making apparatus which continuously and efficiently electrostatically charges the tape at high production rates.

A further object is the provision of such apparatus which produces an electret tape that is substantially free of electrostatic voids or irregularities.

Another object is the provision of a method of making a high quality electret tape continuously at high production rates.

These and other objects of the invention are achieved with apparatus and a technique in which the sponge-like electrode which charges the dielectric layer of the moving tape is maintained wet by pre-applied dielectric fluid on that layer as the latter moves under the electrode and by controlling the air flow against the tape layer as it exits from the electrode so that the drying effect on the electrode is minimal. Such air flow control is accomplished by a baffle between the air blower and the electrode. The tape is moved under the electrode along an upwardly inclined plane with an incline angle selected to insure adequate wetting of the electrode by the pre-applied fluid and at the same time preventing separation of fluid from the exit side of the electrode.

DESCRIPTION OF PREFERRED EMBODIMENTS

Figures 1, 2:
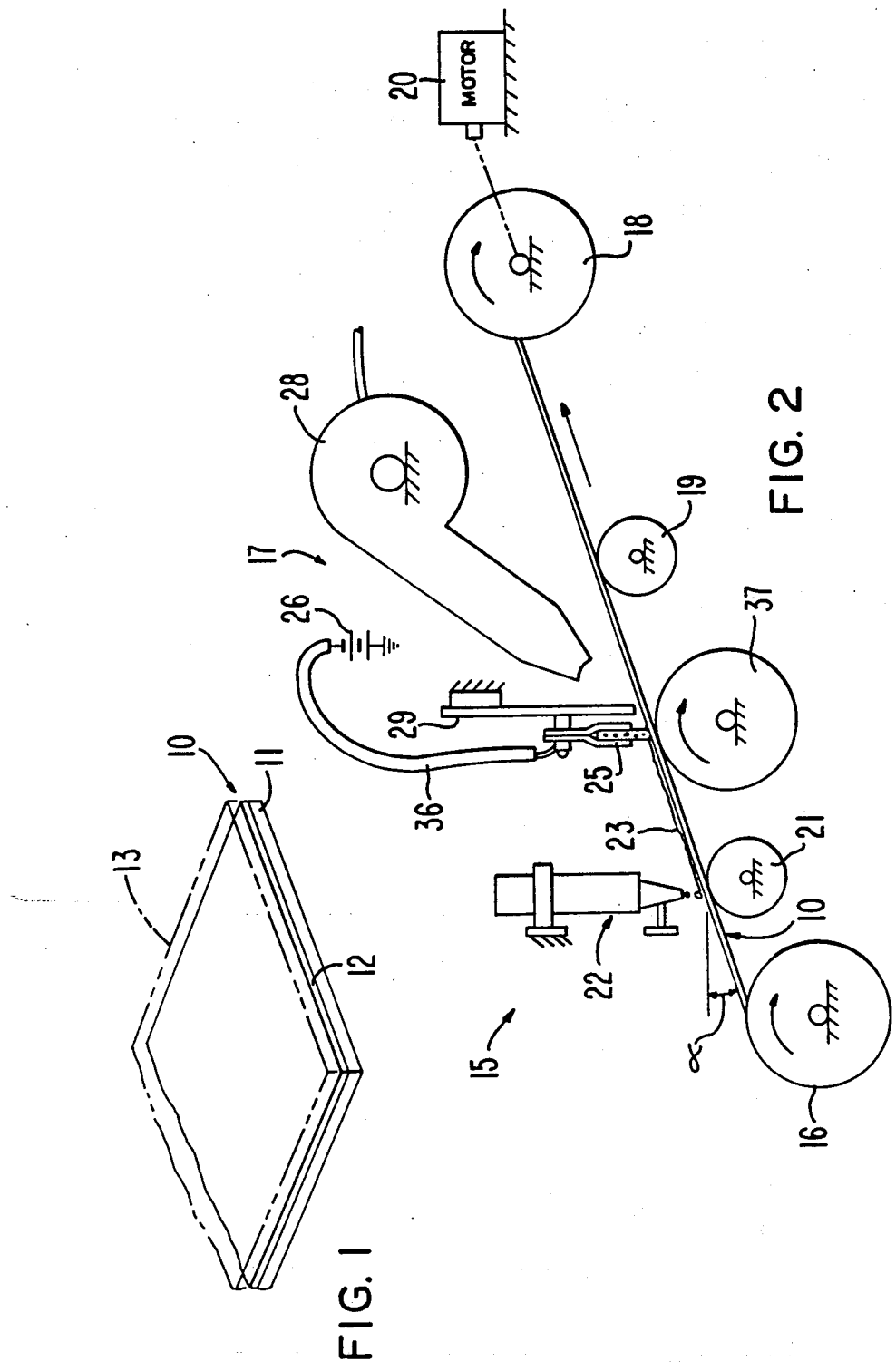
FIG. 1 is a perspective view of part of an electret transducer tape with which this invention is concerned.
FIG. 2 is a schematic side elevation of electret tape-making apparatus embodying the invention.

Referring now to the drawings, FIG. 1 illustrates an electret tape 10 with which this invention is concerned comprising an electrically conductive strip 11 made of copper or the like, and a layer 12 of dielectric material, preferably FEP (fluoroethylenepropylene) Teflon, bonded to strip 11 and having the same width. In practice, the Teflon layer is wrapped completely around strip 11 to insulate it although only one side of the layer, the upper side as viewed, is charged to form an electret. A second electrically conductive strip 13, shown in broken line, is secured by plastic tape or the like to the side of the dielectric layer 12 opposite strip 11 after the layer has been electrostatically charged so that the three-component tape functions as a transducer either as a unidirectional transmitter or unidirectional receiver. For example, as a transmitter the strip 13 may generate ultrasonic waves when an ac source at ultrasonic frequencies is connected across strips 11 and 13. As a receiver, the tape transducer generates an electrical signal across strips 11 and 13 at such frequencies in response to ultrasonic waves incident on strip 13. This transducer principle is more completely described in U.S. Pat. No. 4,382,196 and is useful as a line sensor in intrusion detection systems. This invention is concerned with the electrostatic charging of dielectric layer 12 while bonded to strip 11, designated as tape 10, and does not describe formation of these components with strip 13 into a complete tape transducer. In the following description and in the claims, the terms "tape" and "electret tape" mean the two-element structure of strip 11 and dielectric layer 12.

Figure 3:
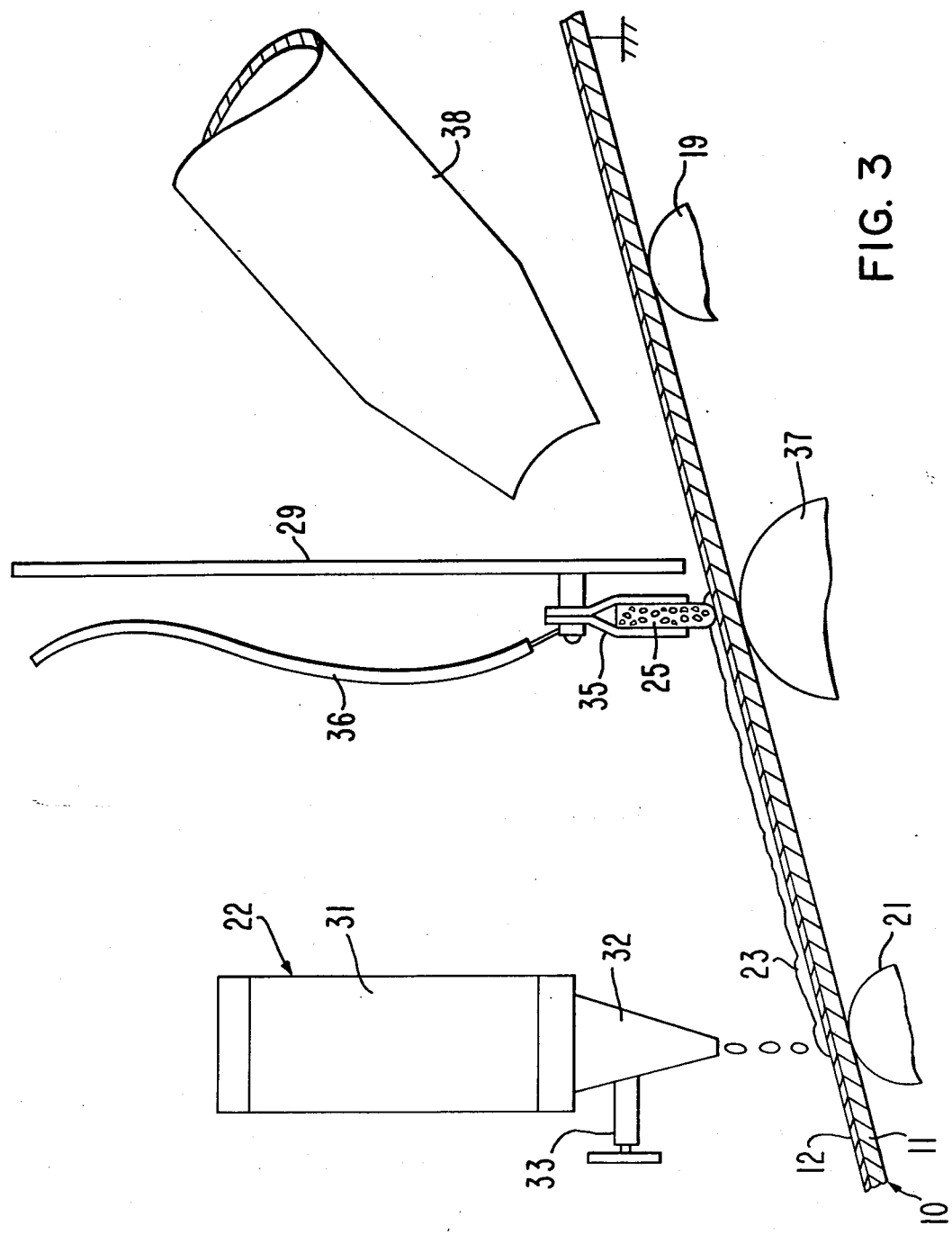
FIG. 3 is an enlarged view of part of FIG. 2 showing structural details of the tape charging assembly.

FIGS. 2 and 3 show electret tape making apparatus 15 embodying this invention and comprising a supply reel 16 on which is wound tape 10 with an uncharged dielectric-layer 12 on the upper (as viewed) surface, an electrostatic charging assembly 17 which charges dielectric layer 12, and a take-up reel 18 on which the charged tape 10 is stored. Reel 18 is driven by a motor 20 in the direction of the arrow to pull the tape from reel 16. In accordance with this invention, tape 10 moves through charging assembly 17 along a plane that is inclined at an angle α relative to horizontal, and this is achieved in a preferred form of the invention by means of support rollers 21 and 19 disposed under the tape and having relative vertical positions to provide the desired tape angle. The purpose of the tape incline angle is explained below. Strip 11 of tape 10 is grounded as shown in FIG. 3.

Charging assembly 17 comprises an applicator 22 of dielectric fluid 23, and electrode 25 electrically connected to a source 26 of high dc voltage, for example 800 volts, a blower 28 on the tape exit side of electrode 25, and a baffle 29 supported between blower 28 and electrode 25 and closely spaced from tape 10.

Applicator 22 preferably is a container 31 having a downwardly opening spout 32 with a flow control valve 33 and positioned to dispense the dielectric fluid on dielectric layer 12 which forms the upper surface of tape 10 across its full width. Alternatively, the fluid applicator may comprise a wheel or a spray nozzle. The amount of fluid applied to the tape is adjusted by valve 33 and in conjunction with tape velocity controls the quantity of fluid that reaches electrode 25 to wet it. Fluid 23 may, by way of example, comprise a mixture of reagent grade solvents of ethyl alcohol, methyl alcohol and acetone.

Electrode 25 preferably is composed of a sponge-like material such as synthetic open-hole foam and is tightly gripped on opoposite sides by a conductive clamp 35 electrically connected to high voltage source 26 by lead 36. The vertical position of electrode 25 is such that it makes full wiping contact with dielectric layer 12 across the full width thereof. A roller 37 supports the tape on the opposite side thereof from electrode 25.

Blower 28 has a nozzle 38 which concentrates and directs the flow of air toward the upper surface of tape 10 generally as it exits from electrode 25. The small gap between baffle 29 and the top of tape 10 permits a narrow stream of air flow to pass along the tape and against electrode 25 immediately adjacent to tape 10 thus minimizing the drying effect on the electrode while effectively drying the dielectric fluid before it separates from the electrode.

Efficient and uniform charging of dielectric layer 12 requires that electrode 25 be wet with fluid 23 at the area of contact with layer 12. If the electrode is excessively wet, however, droplets tend to form at the tape exit side and break away from the electrode, resulting in uncharged spots or voids in layer 12. By applying the fluid directly to the tape across its width prior to contact with electrode 25, the latter is sufficiently wet on the tape entry side to provide good electrical contact with dielectric layer 12 and uniformly charge it. The combination of the pull of gravity on the fluid caused by the slope of the tape as it rises at the exit side of the electrode and the pressure produced by the back flow of blower air against the exit side of the electrode prevents droplet break-away so that the fluid dries while in contact with the electrode. Baffle 29 limits the backward air flow to the junction of the electrode and dielectric layer and so accomplishes the above result without unduly drying the electrode. Practice of this invention has resulted in a uniformly charged tape 2.5 cm wide moving at a velocity of 5 cm/sec and with an incline angle α of from 10° to 30°, preferably 20°.

What is claimed is:

1. Apparatus for making a composite electret tape having an elongated electrically conductive strip and a dielectric layer on one side of said strip, comprising:
   a supply reel for winding thereon said tape with an uncharged dielectric layer;
   a take-up reel for winding thereon said tape with a charged dielectric layer;
   means for moving said tape from said supply reel to said take-up reel such that part of said tape moving between the reels is disposed in an upwardly inclined plane with said dielectric layer on the upper side of the tape;
   means for electrically grounding said strip;
   an electrostatic charging assembly adjacent to said part of said tape and adjacent to said dielectric layer for charging same comprising:
   dielectric fluid applying means adjacent to said dielectric layer for applying dielectric fluid thereto;
   an electrode spaced from dielectric fluid applying means in the direction of movement of the tape and positioned to engage said layer;
   a source of high dc voltage connected to said electrode;
   air blower means for drying said dielectric layer and spaced from said electrode in the direction of tape movement; and
   a baffle between said electrode and said blower means and spaced closely to said electrode and to said layer.

2. The apparatus according to claim 1 in which the angle of said inclined plane relative to horizontal is from 10° to 30°.

3. The apparatus according to claim 1 in which the angle of said inclined plane relative to horizontal is 20°.

4. Apparatus for making a composite electret tape having an elongated electrically conductive strip and a dielectric layer on one side of said strip comprising:
   means for continuously moving said tape in the direction of its length along an upwardly inclined plane with said dielectric layer facing upwardly;
   means for electrically grounding said strip;
   an electrostatic charging assembly adjacent to said dielectric layer comprising:
   dielectric fluid applying means for disposing dielectric fluid to the upper surface of said layer;
   a sponge electrode positioned to engage said layer and spaced from dielectric fluid applying means in the direction of tape movement for charging said dielectric layer;
   a source of high dc voltage electrically connected to said electrode; and
   means for drying dielectric fluid on said tape at the exit side of said electrode prior to separation of dielectric fluid from the electrode.

5. Apparatus according to claim 4 in which the angle of incline of said plane with horizontal is from 10° to 30°.

6. Apparatus according to claim 5 in which said angle is 20°.

7. A method of making a composite electret tape having an electrically conductive strip and a dielectric layer on one side of said strip, consisting of the steps of:
   moving said tape in an upwardly inclined direction with the dielectric layer on the upper side of the strip;
   grounding said strip;
   applying a dielectric fluid to said dielectric layer;
   contacting said dielectric layer with a sponge-like electrode spaced in the direction of tape movement from the point of application of said fluid to said layer whereby dielectric fluid is carried by the tape to said electrode;
   applying a high dc voltage to said electrode, and;
   directing a stream of air against said dielectric layer adjacent to the upper side of said electrode for drying dielectric fluid on the dielectric layer.

8. The method according to claim 7 with the step of restricting the flow of the air stream against the electrode with a baffle adjacent to the electrode whereby dielectric fluid is dried on the layer at the electrode.

* * * * *